United States Patent [19]
Guckel et al.

[11] Patent Number: 5,357,807
[45] Date of Patent: Oct. 25, 1994

[54] MICROMACHINED DIFFERENTIAL PRESSURE TRANSDUCERS

[75] Inventors: Henry Guckel; Todd R. Christensen, both of Madison, Wis.

[73] Assignee: Wisconsin Alumni Research Foundation, Madison, Wis.

[21] Appl. No.: 957,505

[22] Filed: Oct. 5, 1992

Related U.S. Application Data

[62] Division of Ser. No. 626,581, Dec. 7, 1990, Pat. No. 5,189,777.

[51] Int. Cl.$^5$ .......................... G01L 7/08; G01L 9/06
[52] U.S. Cl. .......................................... 73/721; 338/4
[58] Field of Search ................... 73/715, 716–728, 73/756, 706; 361/283; 338/4

[56] References Cited

U.S. PATENT DOCUMENTS

| | | | |
|---|---|---|---|
| 3,449,221 | 6/1969 | Thomas | 204/15 |
| 3,535,137 | 10/1970 | Haller et al. | 117/8 |
| 3,886,584 | 5/1975 | Cook et al. | 357/23 |
| 3,984,582 | 10/1976 | Feder et al. | 427/43 |
| 4,018,938 | 4/1977 | Feder et al. | 427/43 |
| 4,035,522 | 6/1977 | Hatzakis | 427/43 |
| 4,059,480 | 11/1977 | Ruh et al. | 156/644 |
| 4,107,351 | 8/1978 | James et al. | 427/43 |
| 4,203,128 | 5/1980 | Guckel et al. | 357/60 |
| 4,351,653 | 9/1982 | Becker et al. | 55/394 |
| 4,422,905 | 12/1983 | Becker et al. | 204/9 |
| 4,493,753 | 1/1985 | Becker et al. | 204/9 |
| 4,541,977 | 9/1985 | Becker et al. | 264/102 |
| 4,563,250 | 1/1986 | Becker et al. | 204/6 |
| 4,563,251 | 1/1986 | Becker et al. | 204/6 |
| 4,661,212 | 4/1987 | Ehrfeld et al. | 204/11 |
| 4,693,791 | 9/1987 | Becker et al. | 204/11 |
| 4,694,548 | 9/1987 | Ehrfeld et al. | 29/157 C |
| 4,698,285 | 10/1987 | Ehrfeld et al. | 430/5 |
| 4,703,559 | 11/1987 | Ehrfeld et al. | 29/854 |
| 4,705,605 | 10/1987 | Becker et al. | 204/11 |
| 4,730,496 | 3/1988 | Knecht et al. | 73/718 |
| 4,738,010 | 4/1988 | Ehrfeld et al. | 29/149.5 R |
| 4,744,863 | 5/1988 | Guckel et al. | 156/653 |
| 4,780,382 | 10/1988 | Stengl et al. | 430/5 |
| 4,784,935 | 11/1988 | Ehrfeld et al. | 430/321 |

(List continued on next page.)

FOREIGN PATENT DOCUMENTS

| | | |
|---|---|---|
| 0339981A2 | 11/1989 | European Pat. Off. . |
| 8906045 | 6/1989 | PCT Int'l Appl. . |
| 2186376A | 8/1987 | United Kingdom . |

OTHER PUBLICATIONS

H. Guckel, et al., "Fine Grained Polysilicon and Its Application to Pressure Transducers", Proceedings of Fourth International Conference on Sensors and Actuators, Tokyo Japan, Jun. 1987, pp. 277–282.

(List continued on next page.)

*Primary Examiner*—Donald Woodiel
*Attorney, Agent, or Firm*—Foley & Lardner

[57] ABSTRACT

Microminiature pressure transducers are formed on semiconductor substrates such as silicon and include a membrane which spans a cavity over the substrate, with the membrane being mounted to and sealed to the substrate at the peripheral edges of the membrane. The bottom of the cavity forms an overpressure stop to prevent over deflections of the membrane toward the substrate. An overpressure stop formed as a bridge of a material such as nickel extends above the membrane and is spaced therefrom to allow the membrane to deflect freely under normal pressure situations but prevent over deflections. The thickness of the polysilicon membrane and the spacing between the membrane and the overpressure stops is preferably in the range of 10 micrometers or less, and typically in the range of one micrometer. The overpressure stop bridge is formed utilizing deep X-ray lithography to form a well-defined bridge structure. The gap between the membrane and the bottom surface of the bridge is established with a sacrificial layer, such as a polyimide film, which dissolves in a solvent. The transducer is formed utilizing processing techniques which do not affect the performance of the membrane as a pressure sensor and which allow the substrate to have further micromechanical or microelectronic devices formed thereon.

19 Claims, 5 Drawing Sheets

U.S. PATENT DOCUMENTS

| | | | |
|---|---|---|---|
| 4,797,211 | 1/1989 | Ehrfeld et al. | 264/22 |
| 4,815,472 | 3/1989 | Wise et al. | 73/724 |
| 4,853,669 | 8/1989 | Guckel et al. | 338/4 |
| 4,872,888 | 10/1989 | Ehrfeld et al. | 55/16 |
| 4,897,360 | 1/1990 | Guckel et al. | 437/7 |
| 5,013,693 | 5/1991 | Guckel et al. | 437/248 |
| 5,090,246 | 2/1992 | Colla et al. | 73/718 |
| 5,189,777 | 3/1993 | Guckel et al. | 29/621.1 |
| 5,211,058 | 5/1993 | Fukiura et al. | 73/718 |

OTHER PUBLICATIONS

H. Guckel, et al., "Mechanical Properties of Fine Grained Polysilicon: The Repeatability Issue", IEEE Technical Digest for Solid State Sensors & Actuators Hilton Head, South Carolina, Jun., 1988, pp. 96–99.

H. Guckel, et al., "Fine Grained Polysilicon Films with Built-In Tensile Strain", IEEE Tran. on Elect. Devices vol. 35, No. 6, Jun., 1988, pp. 800–801.

H. Guckel, et al., "Construction and Performance Characteristics of Polysilicon Resonating Beam Force Transducers", Pro. of Third Toyota Conf. Nissin Aichi Japan, 1989 pp. 23-1, 23-10.

R. Howe, et al., "Silicon Micromechanics: Sensors and Actuators on a Chip", IEEE Spectrum, Jul., 1990, pp. 29–31, 34.35.

Brochure (In German) "Die LIGA-Technik", by MicroParts, Gesellschaft, 1990.

E. W. Becker, et al., "Fabrication on Microstructures with High Aspect Ratios and Great Structural Heights by Synchrotron Radiation Lithography Galvanoforming and Plastic Moulding (LIGA Process)", Microelectronic Engineering, vol. 4, No. 1, May 1986, pp. 35–36.

W. Ehrfeld, et al., "Fabrication of Microstructures Using the LIGA Process", Proc. IEEE Micro Robots and Teleoperators Workshop, Nov. 9–11, 1987, pp. 1–11.

P. Hagmann, et al., "Fabrication of Microstructures of Extreme Structural Heights by Reaction Injection Moulding", Intl. Polymer Processing IV 1989 pp. 188–195.

W. Ehrfeld, et al., "Microfabrication of Sensors and Actuators for Microrobots" Proc. IEEE International Workshop on Intelligent Robots and Systems, Tokyo Japan, Oct. 31–Nov. 2, 1988, pp. 3–7.

W. Ehrfeld, "Three Dimensional Microfabrication Using Synchrotron Radiation" International Symposium on X-Ray Synchrotron Radiation and Advanced Science and Technology, 15–16 Feb. 1990, pp. 121–141.

W. Ehrfeld, et al., "LIGA Process: Sensor Construction Techniques via X-Ray Lithography", Technical Digest, IEEE Solid State Sensor and Actuator Workshop, 1988, pp. 1–4.

H. Guckel, et al., "Deep X-Ray and UV Lithographies for Micromechanics", Technical Digest, IEEE Solid State Sensor and Actuator Workshop, Hilton Head, South Carolina, Jun. 4–7, 1990, pp. 118–122.

PiRL: Polymide Release Layer, Brochure from Brewer Science, Inc.

STEPS 8,9,10

FIG. 8

STEPS 11, 12

FIG. 9

STEP 13

MICROMACHINED DIFFERENTIAL PRESSURE TRANSDUCERS

This invention was made with United States government support awarded by the National Science Foundation (NSF), Grant No. EET-88-15285. The United States Government has certain rights in this invention.

This is a division of Ser. No. 07/626,581 filed on Dec. 7, 1990, now U.S. Pat. No. 5,189,777, issued Mar. 2, 1993.

FIELD OF THE INVENTION

This invention pertains generally to the field of semiconductor and micromechanical devices and processing techniques therefor, and particularly to microminiature differential pressure transducers.

BACKGROUND OF THE INVENTION

Sensors are devices which typically convert physical variables which are to be measured to electronic signals which become part of a control system. They consist of two parts: the sensor structure and the package which protects the device from environments which are often hostile.

Size reductions in the sensor structure are nearly always beneficial. They allow cost reductions via batch fabrication techniques which are borrowed from microelectronics, and are now being carried out at sufficiently small sizes that the production of such devices can appropriately be referred to by the term micromechanics. Micromechanical sensors or microsensors can sometimes be combined with cofabricated microelectronics to yield performance improvements, and can result in structures which are identified as smart sensors. Microminiaturization can expand sensor application areas. This is exemplified by physical sensors for biological systems. Blood pressure and blood gas analysis devices must be small to be effective.

The fabrication techniques which are most directly available for microsensor fabrication have their origins in microelectronics. The central difficulty which one experiences with such techniques is based on the fact that sensors are fundamentally three-dimensional structures whereas integrated circuit construction is based on planar processing which is, of course, two-dimensional. Presently, nearly all microsensor construction techniques are adaptations of planar integrated circuit processing with modest three-dimensional extensions. Thus, in wafer to wafer bonded sensors, IC processing is combined with silicon bulk machining and wafer to wafer bonding to achieve microsensor production. In surface micromachining, planar processing and lateral etching are combined to achieve the necessary three-dimensionality. However, three-dimensional fabrication and non-silicon technologies are becoming more important for microsensor development.

Pressure transducers are the most used and therefore the best understood sensors. They fall into two classes: relative or differential devices, and absolute transducers. The absolute sensor has been more actively investigated for microminiaturization via surface micromachining. See, for example, U.S. Pat. Nos. 4,744,863 and 4,853,669 to Guckel, et al., for a discussion of such sensors and sealing techniques to produce absolute sensors.

Production of a sealed cavity or "pill box" sensor requires vacuum sealing and electronic sensing of the device. Pill box behavior and electronic sensing together contribute to device performance. Thus, very small deformations of a mechanically stiff diaphragm or membrane are acceptable if the sensing scheme is sufficiently sensitive. An overpressure stop which is either provided by the device or the package is necessary because increasing pressures cause increasing deflections and will eventually lead to pill box failure.

Polycrystalline silicon (polysilicon) can be used as the deformable membrane, as described in the foregoing patents and in U.S. Pat No. 4,897,360, the disclosure of which is incorporated herein by reference. A typical polysilicon diaphragm film will be able to support a maximum strain of about 1.5% before it fractures. It will also have a built-in strain field. This strain level must either be controllable and therefore becomes a part of the design process, or the film must have the property that processing techniques exist which cause the built-in strain to disappear. For the case of an absolute pressure transducer as exemplified in U.S. Pat. Nos. 4,744,863 and 4,853,669, if it is assumed that the transducer is square, the maximum pressure range is defined by a diaphragm deflection at the center of the diaphragm which is equal to the cavity depth under the diaphragm. The deflection of the diaphragm under pressure induces diaphragm strain. The strain field maximizes at the clamped edge midway between the corners. This strain value cannot exceed the maximum allowed strain for the diaphragm material, thus defining and limiting the pressure range of the sensor.

A pressure transducer requires a sensing mechanism. Piezoresistive and capacitive techniques form the most direct approaches. Piezoresistive sensing is the most directly implemented technique and profits from the availability of polysilicon which can be used to produce excellent, stable and dielectrically isolated sensing structures. Such structures can be formed by covering the polysilicon diaphragm with a silicon nitride layer, a patterned and doped polysilicon layer, and a protective nitride layer. The issue becomes then one of performance evaluation for particular resistor doping levels and resistor placements.

Polysilicon resistors are quite different from diffused silicon resistors. The piezoresistive effect in these devices is roughly a factor of five smaller than that of a well designed single crystal counterpart. Longitudinal gage factors are typically slightly above 20 and transverse gage factors are near $-8$. The temperature coefficient of resistance can be positive or negative and can be close to zero. The noise figure for these devices involves only thermal noise, which is normally only found to be true for very good metal film resistors. Polysilicon resistors are dielectrically isolated which allows for higher temperature applications because junction leakage currents are absent.

The placement issue for these devices is again quite different than for single crystal resistor placement. The general rule is simply to locate the resistors in the maximum stress regions on the diaphragm. This would imply longitudinal sections which enter the diaphragm at the support midway between corners. There is, however, a problem. Diaphragm sizes will typically be less than 100 micrometers on a side. The resistors will therefore be quite small, with typical line widths of 4 micrometers. Thus, alignment tolerances as well as line width shifts during polysilicon etching must be considered. A full transducer may use four devices in a bridge configuration, with two resistors which are pressure sensitive and two resistors which are insensitive to pressure because their pill box oxide has not been removed. With this configuration, the half-active full bridge, the maximum output in millivolt per volt of bridge excitation can be calculated at the touch-down pressure.

The difficulties of piezoresistive sensing can be removed by changing the sensing technique or by converting the device from an absolute pressure sensor to a differential transducer. Both approaches are receiving detailed attention. In the first case the piezoresistor can be replaced by a new type of force sensor: the vacuum sealed resonating beam. It is essentially a pill box which contains a doubly clamped free standing beam which can be excited electrostatically. The transduction mechanism is axially applied force to frequency. Its very high sensitivity allows for simpler and more precise measurements. The draw-back is found in the increased complexity of the necessary construction techniques. The device becomes expensive and is of primary use where low pressure precision measurements are required.

SUMMARY OF THE INVENTION

In accordance with the present invention, microminiature pressure transducers are formed on semiconductor substrates, for example, single crystal silicon substrates, to allow measurement of the differential pressure across the substrate. The pressure transducer includes a membrane, preferably formed of polysilicon, which spans a cavity over the substrate, with the membrane being mounted to and sealed to the top side of the substrate at the peripheral edges of the membrane. The bottom of the cavity forms an overpressure stop to prevent overdeflections of the membrane in a direction toward the substrate. Channels extend through the substrate from a remote location such as the bottom side opposite the pressure transducer to communication with the cavity. This allows the membrane to deflect away from the substrate when the pressure on the bottom side of the substrate exceeds the pressure on the top side of the substrate. An overpressure stop formed as a bridge extends across the membrane and is spaced therefrom to allow the membrane to deflect under normal pressure situations but to prevent overdeflections and consequent failure of the membrane. The overpressure stop is preferably formed of a relatively strong structural material, for example, electroplated nickel, so that it will be able to resist the pressure applied by the deflected membrane in contact with the overpressure stop.

The overpressure stop bridge is formed utilizing processing techniques which are consistent with and do not affect the production of the pressure sensor membrane or its physical characteristics or the ability to form microelectronic devices on the substrate. The bottom surface of the bridge facing the membrane is formed to be very smooth and uniform, so that the contact surface of the bridge is uniformly spaced from the membrane. The smoothness of the bottom surface of the bridge avoids premature contact of a portion of the deflected membrane with a high point on the bottom surface of the bridge and possible localized strains or rupture which may occur if a sharp surface of the bridge comes in contact with the membrane. The spacing between the bridge and the membrane must nonetheless be relatively small, typically in the range of 10 micrometers or less, and often must be in the range of one micrometer, and this uniform spacing must be maintained over the span of the membrane, which may extend from a few micrometers to several hundred micrometers. The gap between the membrane and the overpressure stop is chosen to allow free deflection of the membrane under normal pressure conditions and contact of the membrane with the stop under overpressure conditions below a level at which the membrane would rupture.

The differential pressure transducer of the present invention is preferably fabricated utilizing polysilicon membranes formed on silicon substrates in accordance with established processing procedures. The peripheral areas of the membrane are mounted to and sealed to the substrate so that the ambient atmosphere on the top side of the substrate cannot flow into the cavity beneath the membrane. However, the cavity itself is not vacuum sealed but rather is in communication through channels in the substrate to the atmosphere at a position remote from the cavity and membrane, such as on the bottom side of the substrate. These channels may be formed, for example, by etching through the substrate to the cavity from the bottom side.

The overpressure stop bridge is preferably fabricated utilizing deep X-ray lithography. The gap between the membrane and the bottom surface of the bridge is established with a sacrificial layer, which may consist of a polyimide film which dissolves in a solvent such as polymethyl methacrylate developer. The form of the sacrificial layer is accomplished by standard patterning techniques. A plating base is then applied to the sacrificial layer and the adjoining areas of the substrate. This plating base may comprise an unpatterned thin film of titanium which is followed by a deposition of a thin film of nickel. The entire top substrate surface is then covered by a thick layer of X-ray photoresist casting material, for example, cross-linked PMMA. The X-ray mask which defines the areas which are to be plated is then optically aligned and clamped in an X-ray exposure fixture, with exposure followed by developing which removes the X-ray exposed PMMA to the plating base to define a mold area. The bridge material, for example, nickel, is then deposited (for example, by electroplating) into the mold area to thicknesses which are slightly less than the PMMA thickness. All remaining PMMA is then removed, the plating base is next removed, and the sacrificial layer is removed as a final step.

The membrane of the differential pressure sensor may have piezoresistive polysilicon resistors formed therein for deflection sensing. These resistors are preferably covered with silicon nitride which acts as an insulator and surface passivation barrier. Because of this barrier layer, the membrane may then be covered with a thin layer of metal which can be used to form one plate of a capacitor, with the conductive overpressure stop bridge forming the second plate of the capacitor. This capacitor will change in capacitance with deflections of the membrane, thereby with changes in pressure, and thus can be utilized to produce a pressure measurement signal which can be correlated with the signal provided from the piezoresistors, providing a redundant, self-correlated sensing system. Furthermore, if a DC voltage is applied between the metal plate of the membrane and the overpressure stop bridge, the membrane can be deflected a selected amount. Thus, proper application of DC voltages can be used to drive the membrane to a desired zero deflection position in the presence of a particular pressure across the membrane. In this manner, auto-zeroing can be implemented for precision application purposes.

The differential pressure sensor of the present invention allows pressure measurements down to very low pressures, while achieving high precision at these low pressure ranges. Because of the sensitivity involved, the pressure sensor may be utilized as, for example, a microphone which responds to rapidly varying low level pressure waves. By utilization of conductive metal on the facing surfaces of both the membrane and the overpressure stop, the contact of these two surfaces at an overpressure condition effectively closes a switch so that a current can be passed between the two surfaces in contact, thereby providing a pressure sensitive switch. Several of the differential pressure transducers of the present invention designed for measuring different pressure ranges can be combined on the same chip, thereby providing an autoranging sensor which may be combined with electronics to produce a smart sensor.

Further objects, features and advantages of the invention will be apparent from the following detailed description when taken in conjunction with the accompanying drawings.

DETAILED DESCRIPTION OF THE INVENTION

Figure 1:
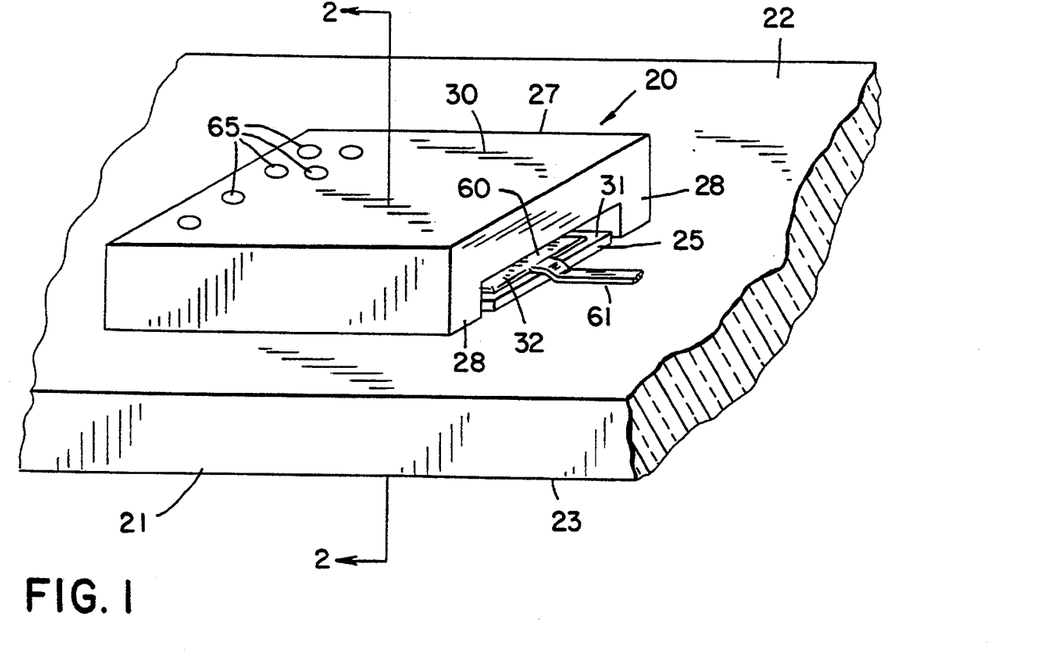
FIG. 1 is a schematic perspective view of the differential pressure transducer of the present invention on a substrate.

With reference to the drawings, a differential pressure transducer in accordance with the present invention is shown generally at 20 in FIG. 1 mounted on and formed with a substrate 21 which may be of a semiconductor material, preferably single crystal silicon. The substrate 21 has a top side 22 and a bottom side 23, and may be sealed in an enclosing structure (not shown) so that the ambient atmosphere facing the top side 22 of the substrate is sealed off from the atmosphere facing the bottom side 23 of the substrate. The substrate 21 is preferably sufficiently thick (the dimensions of the substrate relative to the transducer structure above the substrate are shown exaggeratedly small in FIG. 1) so that the substrate 21 itself does not substantially deflect due to changes of pressure across the substrate.

The transducer structure 20 includes a deformable membrane 25 formed on the top side 22 of the substrate and which deflects with the difference in pressure between the top side 22 and bottom side 23 of the substrate. An overpressure stop bridge 27 is formed on the top surface 22 of the substrate having base sections 28 which mount to the substrate at positions to either side of the membrane 25 and a bridge member 30 which spans over and is spaced above the top surface 31 of the membrane. The bottom surface 32 of the bridge 27 is spaced slightly above the membrane 25 a distance sufficient to allow the membrane to deflect under ordinary pressures but which allows the membrane to contact and be stopped from further deflection by the bridge member upon over pressures which, if unopposed, would rupture the membrane.

Figure 2:
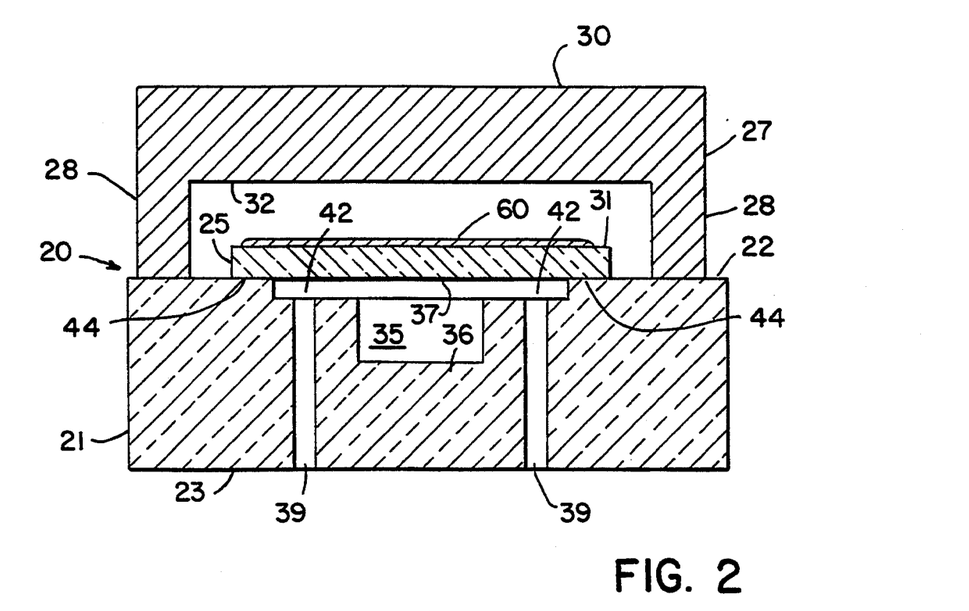
FIG. 2 is a simplified cross-sectional view through the differential pressure transducer of FIG. 1.

A cross-sectional view through the differential pressure transducer is shown in FIG. 2. As illustrated therein, a cavity 35 is formed in the substrate 21 below the membrane and has a bottom 36 which is spaced downwardly from the bottom surface 37 of the membrane. Again, for purposes of illustration, the relative dimensions of the structures are shown greatly exaggerated in FIG. 2, it being understood that the lateral dimensions of the membrane and the cavity would be much larger with respect to the spacing between the membrane and the bottom of the cavity 36 as well as the spacing between the membrane and the bottom surface 32 of the bridge. The bottom surface 36 of the cavity provides a stop member to stop deflections of the membrane downwardly toward the substrate, as the bottom surface 32 of the bridge provides a stop member against deflections of the membrane upwardly away from the substrate.

To provide communication between the cavity 35 and the ambient atmosphere facing the bottom side 23 of the substrate, a flow channel or a plurality of channels 39 are formed in the substrate extending from the bottom surface 23 to the cavity, preferably to lateral shallow extensions 42 of the cavity which extend away from the deeper central portion of the cavity defined by the bottom surface 36. It is generally preferred to have the flow channels 39 extend to the lateral flow channel extensions 42 of the cavity rather than to the deeper portion of the cavity itself. Bringing the flow channels into the bottom surface 36 of the cavity could, under some circumstances, compromise the effectiveness of the bottom surface of cavity 36 as a pressure stop, as by weakening the structural strength of the area of the substrate beneath the cavity bottom surface 36. Alternatively, flow channels (not shown) may be extended laterally in the substrate to openings at a remote position on the top surface 22 of the substrate where such channels may be connected to conduits (not shown) which communicate with an ambient isolated from the ambient atmosphere over the membrane.

The present invention is adapted for construction as a micromechanical device. In micromechanical devices, the spacing between the membrane 25 and the bottom surface 32 of the bridge 30 and between the membrane and the bottom surface 36 of the cavity, which is the maximum allowable deflection of the membrane, will generally be less than 10 micrometers and typically less than 1 micrometer. The thickness of the bridge span 30 of the overpressure stop bridge 27 will be relatively thick compared to this dimension. For example, where electroplated nickel is utilized as the material of the bridge 27, the thickness of the bridge section may be several hundred micrometers, e.g., 300 micrometers.

The substrate is desirably formed of a single crystal silicon wafer of the type conventionally used in microelectronic processing. The membrane 25 can be formed by various processing techniques. A preferred technique for formation of polysilicon membranes is set forth in U.S. Pat. Nos. 4,744,863 and 4,853,669 by Guckel, et al., and by the polysilicon processing techniques set forth in U.S. Pat. No. 4,897,360, the disclosures of which are incorporated herein by reference. The processing conditions to create the polysilicon membrane may be substantially as set forth in the first two patents with the exception that the cavity 35 is not vacuum sealed but rather is vented to the atmosphere through the channels 39. Although the cavity 35 is shown as being formed completely in the substrate 21, the cavity could be formed above the surface 22 of the substrate by forming the polysilicon membrane in a manner in which it extends above the substrate; in either case, the membrane 31 is sealed to the surface 22 of the substrate, with intervening material as appropriate, at the peripheral portions 44 of the membrane.

Figure 3:
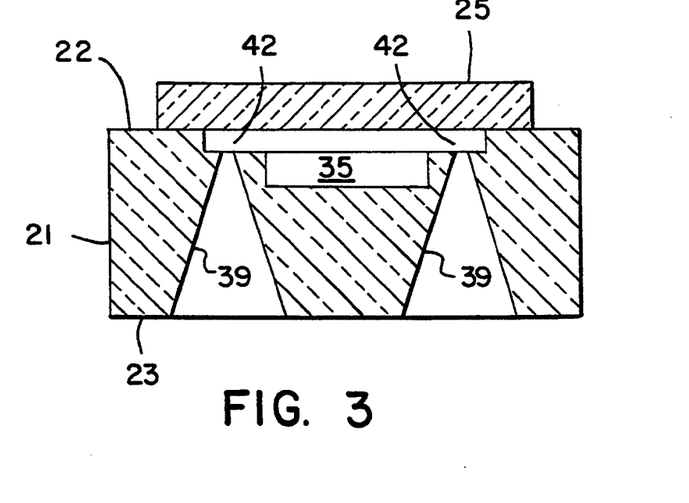
FIG. 3 is a simplified cross sectional view of a structure formed during the production of the differential pressure transducer of FIGS. 1 and 2 having a membrane formed on a substrate.

Following the processing techniques in the foregoing referenced patents, an initial structure is formed thereon composed of the substrate 21 with the polysilicon membrane 25 thereon as shown in FIG. 3. For purposes of illustration, the channels 39 are shown as pyramidal channels in FIG. 3, which are the type of channels that would be formed by preferential etching of the single crystal silicon of the substrate 21 starting from the bottom surface 23 of the substrate. The etching is terminated when the channels 39 break through into the shallow extension portions 42 of the cavity 35. In forming the polysilicon membrane, the area of the cavity may be filled with an etchable material, such as silicon dioxide, and the polysilicon layer is then formed thereon as described in the foregoing patents. The peripheral portions of the polysilicon will be deposited on the seal around the membrane. The channels 39 may then be etched until the channels reach the silicon dioxide. A silicon dioxide etchant is then applied to etch out the silicon dioxide to form the cavity without affecting the single crystal or polysilicon material. It should be noted that the cavity 35 will typically be square or rectangular in shape, and the shallow extensions 42 forming flow channels may also be square or rectangular in their outer periphery. Etching through the silicon substrate to provide the openings 39 shown in FIG. 3 may be carried out using conventional etching techniques which are well known, for example, as shown in U.S. Pat. Nos. 4,203,138 and 4,234,361.

Figure 4:
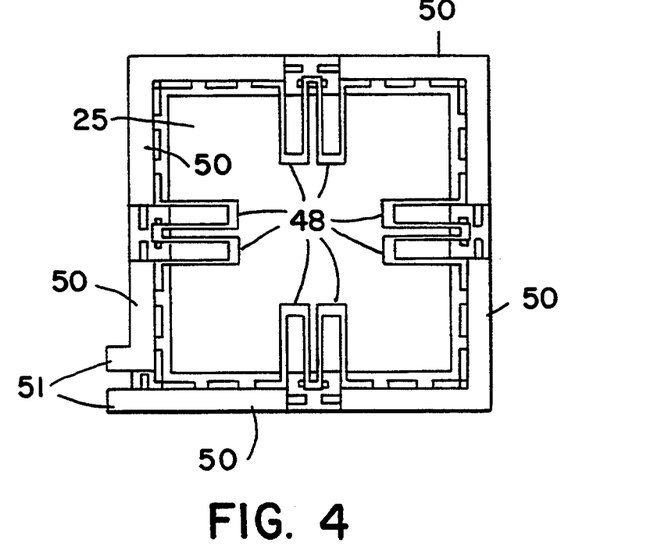
FIG. 4 is an exemplary resistor layout for sensing deflections of the membrane of FIG. 3.

To provide sensing of the deflections of the membrane 25, polysilicon piezoresistors 48 may be formed on the top surface of the membrane 25, as shown in FIG. 4. Formation of such resistors is described in U.S. Pat. Nos. 4,744,863 and 4,853,669. Preferably, the four resistors 48 are connected together to form a single resistor by metal interconnection strips 50 which terminate at terminal sections 51. With diaphragm sizes typically less than one hundred micrometers on a side, the resistors 48 will often be quite small, with typical line widths of 4 micrometers. To avoid problems that may occur with line width shifts during polysilicon etching, the resistors may be interconnected as shown in FIG. 4 so that there is one resistor per diaphragm membrane. Such a layout is reasonably insensitive to alignment errors. A full transducer can utilize four devices and a bridge configuration, with two resistors being pressure sensitive and two which are not sensitive to pressure.

Of particular significance in the present invention is the formation of the overpressure stop bridge 27 which allows the present invention to function as a differential pressure transducer by providing an overpressure stop for deflections of the membrane away from the substrate. This overpressure stop is formed in a manner which is consistent with the prior production of the deformable membrane on the silicon substrate as well as with subsequent processing that may be desired on the substrate for the formation of other micromechanical or microelectronic devices.

Figure 10:
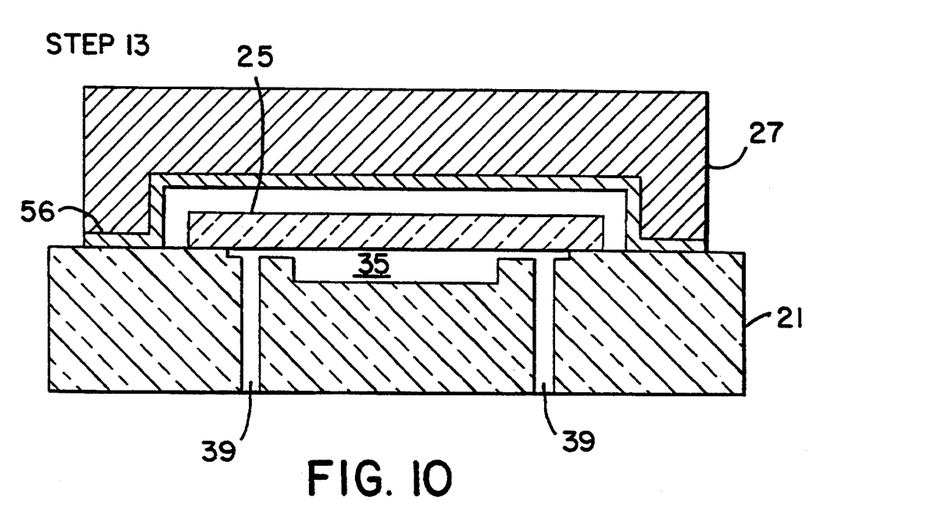

The following summarizes the formation of the overpressure stop bridge. Production of this bridge is preferably carried out utilizing deep X-ray lithography. Such techniques are generally described in the articles by H. Guckel, et al., "Deep X-Ray and UV Lithographies for Micromechanics," 1990 IEEE Solid State Sensor and Actuator Workshop Digest, Hilton Head, S.C., USA, Jun. 4–7, 1990 and W. Ehrfeld, et al., "LIGA Process: Sensor Construction Techniques via X-Ray Lithography," Technical Digest, IEEE Solid-State Sensor and Actuator Workshop, 1988, pp. 1–4. The gap between the top of the membrane 25 and the bottom of what is to be the overpressure stop is established with a sacrificial layer, which may be formed, for example, of polysilicon removable with a hydrazine enchant or a dissolvable polyimide film which can be removed by a solvent such as a polymethyl methacrylate (PMMA) developer. The patterning of the sacrificial layer is carried out utilizing standard patterning techniques. The next step is that of applying a plating base. If desired, the plating base may be applied over at least a portion of the substrate as well as over the sacrificial release layer such that when the sacrificial release layer is removed, a portion of the metal which is deposited on the plating base remains on the placing base attached to the substrate, as shown in FIG. 10. This may be an unpatterned film of titanium which is followed by a nickel deposition. The entire substrate is next covered by a thick layer, for example 100 micrometers, of photoresist casting layer which may be cast, cross-linked PMMA. The X-ray mask which defines the areas which are to be plated is next optically aligned and clamped in an X-ray exposure fixture. X-ray exposure, preferably by synchrotron radiation, is followed by developing which removes the exposed PMMA casting layer down to the plating base to define a mold area. Electroplating of the bridge material, for example, nickel, follows to create a bridge in the mold area of a thickness which is slightly less than the PMMA thickness. Typical thicknesses are 100 micrometers and greater. All remaining PMMA is then removed. The plating base is next removed and the sacrificial layer is removed as the final step.

The following is a detailed description of the bridge formation process with reference to the illustrative views of FIGS. 5–10.

Figure 5:
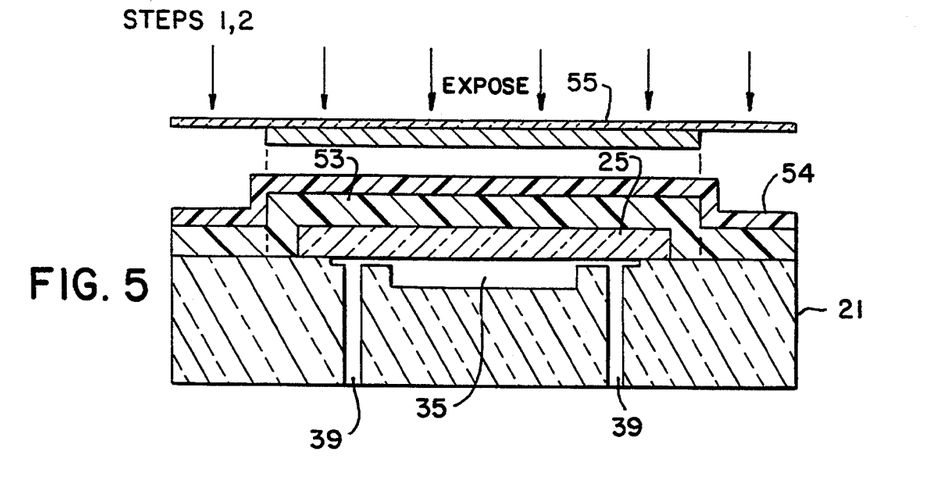
FIGS. 5-10 are schematic cross-sectional views of a membrane formed on a substrate as in FIG. 3 showing the subsequent steps of formation of the overpressure stop bridge.

Steps 1 and 2, FIG. 5

Apply sacrificial layer:
spin APX-K1 adhesion promoter (from Brewer Science, Inc., Rolla, Mo.) at 3 krpm for 30 seconds, and bake on hotplate at 130° C. for 30 seconds, then
spin PiRL (I) (polyimide release layer formulated for $0.8\mu$ at 3500 rpm from Brewer Science, Inc., Rolla, Mo.) at 3.5 krpm for 60 seconds, and bake on hotplate at $100\pm1°$ C. for 2 minutes and immediately thereafter on a second hotplate at $210\pm1°$ C. for 1 minute. Second bake temperature is critical as it determines etch rate during patterning and etch rate during the eventual removal of the patterned sacrificial layer.

Pattern sacrificial layer 53:
spin Shipley 1400-27 positive photoresist 54 at 5 krpm for 30 seconds, prebake in oven at 90° C. for 30 minutes, expose overpressure stop pattern with optical mask 55 into photoresist, develop pattern in photoresist and subsequently in PiRL using two baths of Shipley MF-321 positive photoresist developer: develop in first bath for 60 seconds to develop the photoresist and an additional 3–4 minutes in second bath to remove the opened regions of PiRL. Follow with a 10 minute DI (deionized) water rinse.

Figure 6:
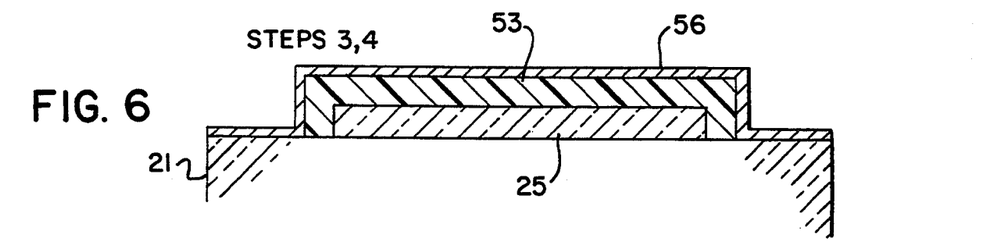

Steps 3 and 4, FIG. 6:

Prepare substrate wafers 21 for plating base deposition:

perform $O_2$ plasma descum for 4 minutes. The following parameters pertain to a Plasma Therm PK 1241 RIE/plasma etcher:

25 sccm $O_2$, $P_{min}=10$ mT (milliTorr), $P_{operate}=30$ mT, 100 W, remove photoresist by immersing wafers in VLSI grade acetone for 3 minutes, follow with rinse in DI water for 10 minutes, perform second $O_2$ plasma descum with above parameters for 1 minute, treat wafers with 50:1 HF (hydrofluoric acid) dip for 30 seconds, rinse with DI water for 5 minutes and load directly into vacuum system for sputtering.

Sputter plating base 56:

A Ti/Ni plating base is used: 150Å Ti followed by 300Å Ni.

Figure 7:
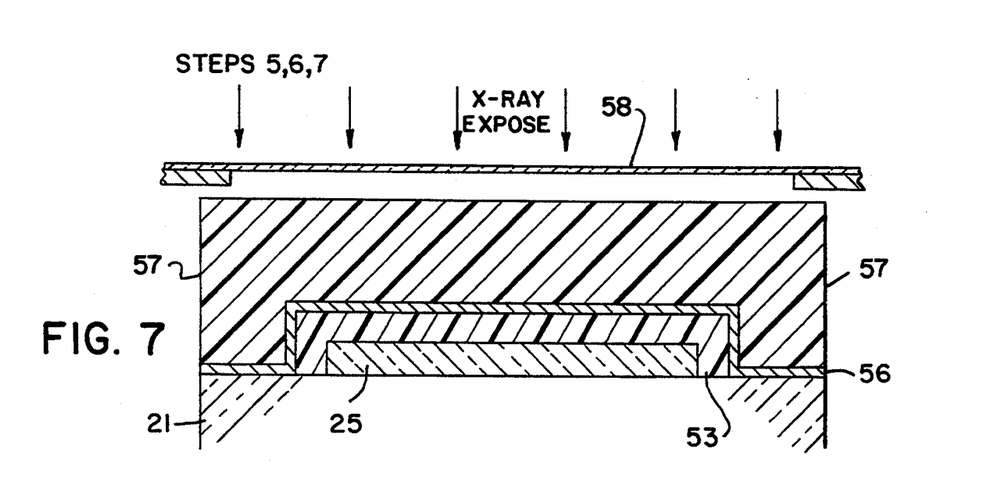

Steps 5, 6 and 7, FIG. 7:

Prepare wafers for PMMA casting:

Immediately after unloading substrates from the vacuum system, an adhesion promoter and a layer of linear polymer is spun on the plating base:

the adhesion promoter is prepared for each run 4.5 hours prior to application and consists of the following:

95±1 ml MeOH (methyl alcohol)

5.0±0.1 ml $H_2O$ 0.10±0.01 ml TMPMA (3-Trimethoxysilyl) Propyl methacrylate, Aldrich #23,579-2)

flood wafer with adhesion promoter and spin at 2.0 krpm for 40 seconds, follow by spinning KTI 9% 496K PMMA at 8.0 krpm for 60 seconds, anneal in programmable oven under 2.0 lpm (liters per minute) $N_2$ using the following cycle 1° C./min. ramp up to 180° C., hold 1.0 hours at 180° C., −1° C./min. ramp down to room temperature.

Cast PMMA 57:

Casting is performed using two premixed solutions:

Solution I:

35 wt. % PMMA—medium molecular weight—Aldrich #18,224-9

61 wt. % MMA (methy methacrylate)—Aldrich #M5,590-9

2 wt. % EGDA—Ethylene glycol dimethacrylate—Aldrich #33,568-1

2 wt. % DMA—N,N-Dimethylaniline—Aldrich #D14,575-0

Solution II:

35 wt. % PMMA 62 wt. % MMA 2 wt. % EGDA 1 wt. % BPO—Benzoyl peroxide—Aldrich #17,998-1

The inhibitor in the MMA is removed using a disposable inhibitor removing column (Aldrich #30,631-2). The 35 wt. % PMMA must first be dissolved in the MMA (∼1 week).

Solutions I and II are mixed to form a "syrup" just prior to casting using a vacuum-mixer. The PMMA syrup is applied to the wafer which is then put in a casting fixture to press the PMMA to the desired thickness. The samples remain under clamping for 48 hours and then are annealed in a programmable oven under 2 lpm $N_2$ as follows:

20° C./hour ramp up to 110° C., hold at 110° C. for 1 hour,

−5° C./hour ramp down to room temperature.

Align X-ray mask 58 and expose with synchrotron radiation:

The substrates are aligned to the corresponding X-ray mask 58 with a pattern to define the PMMA/nickel, using a Karl Süss double sided aligner. A silicon nitride X-ray mask with the plating base removed after gold plating is used as it is optically transparent and the substrate may readily be viewed through the SiN membrane regions. Once the X-ray mask 58 is aligned to the sacrificial layer on the substrate they are clamped together in the alignment fixture and brought to the synchrotron for exposure. Synchrotron exposure conditions (UW-Madison Aladin synchrotron) are, at 1GeV, 20 Torr He, 275 μm Be filter, expose for a dose of 3.5 kJ/cm$^3$ at the bottom of the PMMA.

Figure 8:
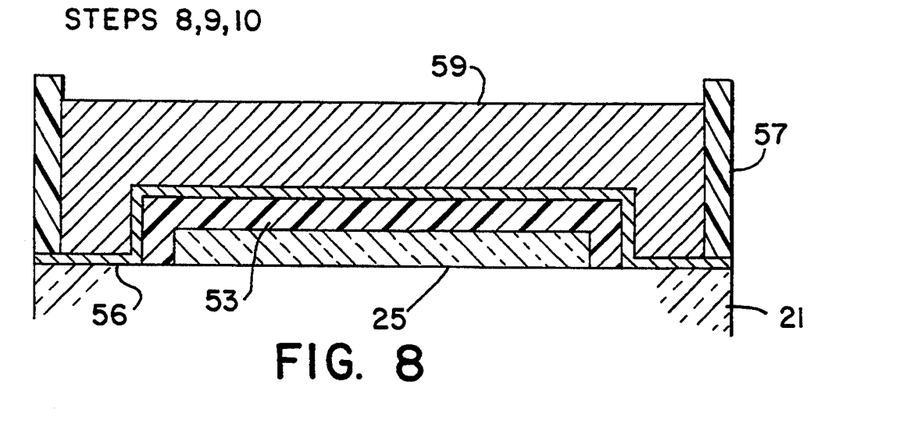

Steps 8, 9 and 10, FIG. 8:

Develop PMMA 57:

The development sequence includes a developer bath and two rinse baths and consists of:

developer:

60% vol. 2-(2-Butoxyethoxy) ethanol

20% vol. Tetrahydro-1-40 Oxazin (Morpholine)

5% 2-Aminoethanol (Ethanolamine)

15% DI water first rinse:

80% 2-(2-Butoxyethoxy) ethanol

20% Water second rinse:

100% Water

The development sequence for 100 μm PMMA exposed as in step 7 is:

a) develop in developer bath at 35.0±0.5° C. for 25 minutes with agitation, b) rinse in first rinse bath at 35.0±0.5° C. for 20 minutes with agitation, c) rinse in second rinse bath at 35.0±0.5° C. for 5 minutes with agitation.

Prepare substrates for nickel electroplating 59:

the substrates must be dried thoroughly with nitrogen and then descummed with an oxygen plasma under the following conditions:

$O_2=25$ sccm, $P_{min}=10$ mT, $P_{operate}=30$ mT, 50 W plasma, etched in a cycle of 15 seconds on/45 seconds off for a total on-time of 90 seconds, precede nickel plating with an HCl treatment: 5% by vol. for 15 minutes.

Figure 9:
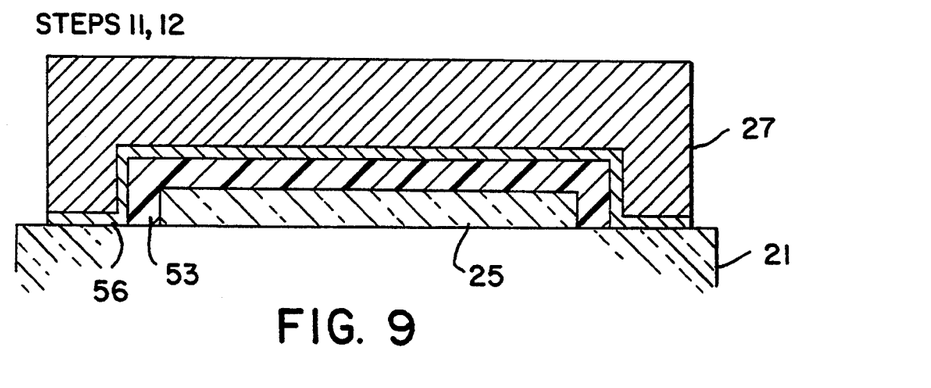

Electroplate nickel 59:

electroplating takes place in a nickel sulfamate bath at 52° C. with the following conditions:

plate nickel at 20 mA/cm$^2$ for first five microns then ramp to 50 mA/cm$^2$ for the rest of the deposition, rinse with DI water for 10 minutes, Steps 11 and 12, FIG. 9:

Remove field PMMA 57:
blanket synchrotron expose using same conditions as step 7,
develop PMMA using same cycle as in step 8.

Remove plating base 56:
The plating base 56 must be removed in the unplated regions to allow access to the sacrificial layer. The following steps are used:
etch nickel in 5% by vol. HCl for 40 minutes,
etch titanium in 200:1 HF for 5 minutes.

Step 13, FIG. 10:

Etch sacrificial layer 53:
The PiRL sacrificial layer 53 may be removed using an alkaline solution, for example, positive photoresist developer. Ammonium hydroxide is found to work well with a lateral etch rate at room temperature of about 10 μm/hour.

Figure 11:
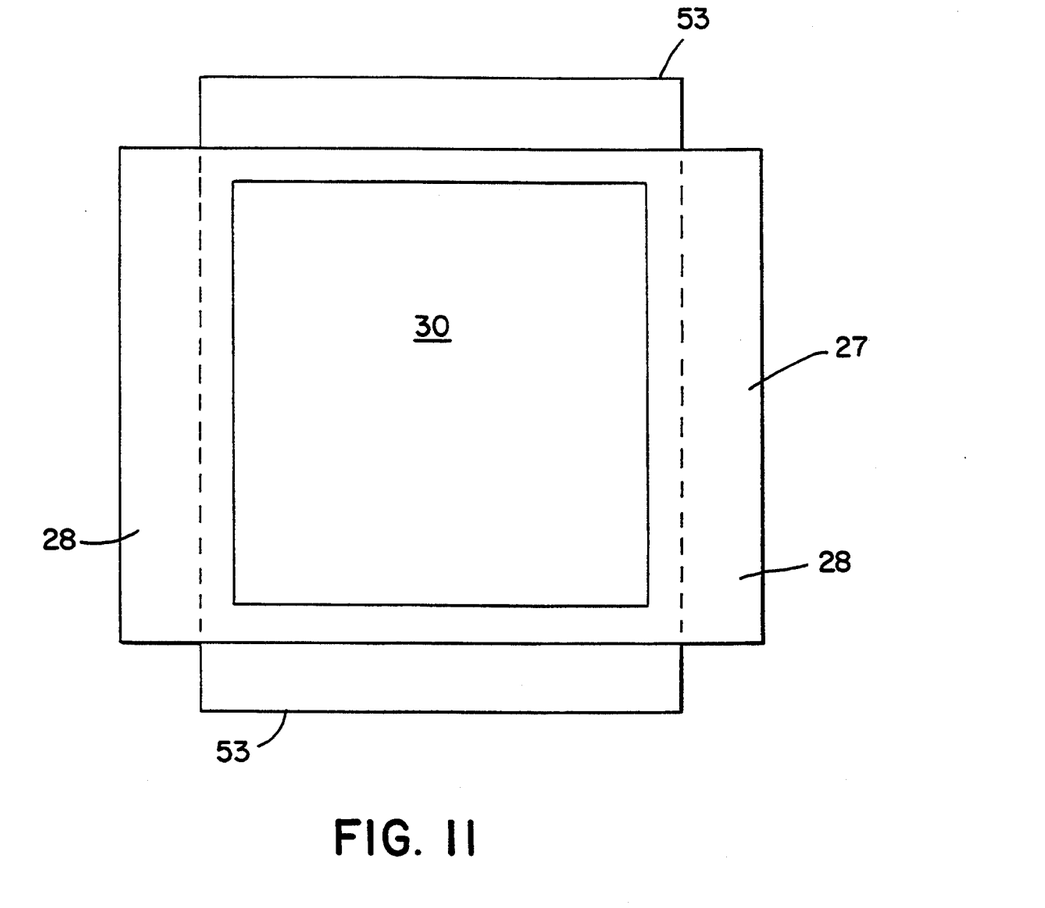
FIG. 11 is a top plan view of the bridge formed on the substrate at the step shown in FIG. 9.

FIG. 11 shows a top view of the structure as in FIG. 9 before the sacrificial layer 53 is removed. As shown in FIG. 11, the sacrificial layer 53 extends outwardly from the two open ends of the bridge 27 between the base areas 28 of the bridge.

Because the polysilicon resistors 48 are preferably covered with a layer of silicon nitride which acts as an insulator and surface passivation barrier, a thin layer of metal (e.g., a layer 60 of aluminum as shown in FIGS. 1 and 2) can be formed on the top surface 31 of the membrane without degrading the performance of either the membrane or the resistors. A lead line 61 can be formed from the conducting layer 60 to a position on the substrate away from the sensor to allow external electrical connection to the conducting layer 60. The layer 60 forms one plate of a capacitor with the other plate being formed by the metal overpressure stop bridge 27. This capacitor will change in capacitance as the membrane 25 deflects toward and away from the bridge. The change in pressure as measured by the change in capacitance should correlate with the measured change in pressure obtained from the piezoresistors. By providing electrical circuitry which compares the measurements obtained from the two separate types of sensing devices, it is possible to verify that accurate readings of pressure are being obtained and that neither the capacitive sensing or the piezoresistive sensing has failed.

Furthermore, if a DC voltage is applied between the plate defined by the layer 60 and the bridge 27, the membrane 25 can be deflected up by virtue of the electrostatic force imposed on the membrane. In addition, by insulating the bridge 60 and the membrane 25 from the substrate 21 and by doping the substrate under the cavity floor 36 such that it is conductive, a capacitor can be formed between the conductive substrate under the bottom of the cavity and the metal plate 60. A DC voltage applied to this capacitor will draw the membrane toward the cavity floor. Thus, by applying appropriate DC voltages between the bridge and the metal layer 60 or between the substrate under the cavity floor 36 and the metal layer 60, or both, the membrane 60 can be driven to a desired zero deflection position in the presence of a selected differential pressure across the membrane. In this way, auto-zeroing can be implemented where precision low pressure measurements are required.

Because of the high sensitivity and ability to sense relatively low differential pressure changes, the pressure transducer of the present invention can serve as a microphone. In such an application, the bridge 27 is preferably perforated with a series of holes 65, shown in part in FIG. 1, which serve to transmit the sound pressure to the membrane and also effectively serve as an acoustic filter to provide a desired frequency response. Because the pressure transducer of the present invention is formed on a silicon or other semiconductor substrate on which microelectronic devices may also be formed, appropriate electronics such as input amplifiers can be formed right on the substrate adjacent to the pressure transducer microphone, thereby minimizing electrical noise that may be introduced by long lead lines from the microphone to the amplifiers.

For measurements of a broad range of pressures, several pressure transducers in accordance with the present invention can be formed on the same chip, each transducer being selected to have a different range of pressures to which it best responds. Appropriate electronics can be incorporated into the same chip as that on which the transducers are formed so that the signal from the proper transducer for the pressure being applied will automatically be selected by the transducer measurement circuitry.

It is understood that the invention is not confined to the particular construction and embodiments set forth herein, but embraces such modified forms thereof as come within the scope of the following claims.

What is claimed is:

1. A micromachined differential pressure transducer comprising:

(a) a substrate having top and bottom sides;

(b) a deformable membrane mounted to and sealed at its peripheral edges to the top of the substrate and spaced from the substrate at its central portion to define a cavity which is sealed between the membrane and the substrate, the bottom of the cavity in the substrate being spaced from the membrane to allow normal deflections of the membrane but providing an overpressure stop for membrane deflection toward the substrate to prevent damage to the membrane;

(c) at least one channel leading from a remote position in the substrate to the cavity to provide communication therefrom to the cavity;

(d) an overpressure stop mounted to the top of the substrate and having a bridge portion spanning the membrane and spaced therefrom to allow normal deflections of the membrane while providing an overpressure stop to prevent displacements of the membrane away from the substrate which would damage the membrane, the spacing between the overpressure stop bridge and the membrane and between the membrane and the bottom of the cavity being less than about 10 micrometers; and (e) means for sensing the deflections of the membrane.

2. The transducer of claim 1 wherein the substrate is formed of single crystal silicon.

3. The transducer of claim 1 wherein the membrane is formed of polycrystalline silicon.

4. The transducer of claim 3 including piezoresistive resistors formed on the polysilicon membrane to provide the means for sensing the deflections in the membrane by changes in the resistance of such resistors.

5. The transducer of claim 4 wherein the bridge is formed of a conductive metal, and further including a layer of conductive metal formed on the top surface of the membrane such that a capacitor is formed between the metal layer on the membrane and the bridge to provide the means for sensing deflections of the membrane by measuring the change in capacitance of such capacitor which is indicative of changes in displacement of the membrane, whereby the measurements of membrane displacements made by the change in capacitance and by the change in resistance of the piezoresistors can be correlated with each other.

6. The transducer of claim 1 wherein the overpressure stop bridge is formed of electroplated nickel.

7. The transducer of claim 4 including a layer of conductive metal on the top surface of the membrane facing the overpressure stop bridge such that the layer of metal on the membrane and the bridge form two plates of a capacitor to provide the means for sensing the deflections of the membrane by changes in capacitance of such capacitor.

8. The transducer of claim 1 wherein the cavity is defined as an indentation in the substrate.

9. The transducer of claim 6 wherein the indentation has a deep central portion and shallow peripheral portions, and wherein the channel in the substrate is in communication with the shallower peripheral portions of the cavity.

10. The transducer of claim 1 wherein the channels are formed to extend from the bottom side of the substrate through the substrate to communication with the cavity.

11. The transducer of claim 1 wherein the bridge is formed of a conductive metal, and further including a layer of conductive metal formed on the top surface of the membrane facing the bridge such that a capacitor is formed between the metal layer on the membrane and the bridge to provide the means for sensing deflections of the membrane by changes in capacitance of such capacitor.

12. The transducer of claim 1 wherein the membrane has a thickness in the range of 10 micrometers or less.

13. The transducer of claim 1 wherein the membrane has a thickness of approximately 1 micrometer.

14. A micromachined differential pressure transducer comprising:
 (a) a single crystal silicon substrate having top and bottom sides;
 (b) a deformable polycrystalline silicon membrane mounted to and sealed at its peripheral edges to the top of the substrate and spaced from the substrate at its central portion to define a cavity which is sealed between the membrane and the substrate, the bottom of the cavity in the substrate being spaced from the membrane to allow normal deflections of the membrane but providing an overpressure stop for membrane deflection toward the substrate to prevent damage to the membrane, the membrane having a thickness of about 10 micrometers or less;
 (c) at least one channel leading from a remote position in the substrate to the cavity to provide communication therefrom to the cavity;
 (d) an overpressure stop formed of electroplated metal mounted to the top of the substrate and having a bridge portion spanning the membrane and spaced therefrom to allow normal deflections of the membrane while providing an overpressure stop to prevent displacements of the membrane away from the substrate which would damage the membrane, the spacing between the overpressure stop bridge and the membrane and between the membrane and the bottom of the cavity being less than about 10 micrometers; and
 (e) means for sensing the deflections of the membrane.

15. The transducer of claim 14 wherein the overpressure stop bridge is formed of electroplated nickel.

16. The transducer of claim 14 including a layer of conductive metal on the top surface of the membrane facing the overpressure stop bridge such that the layer of metal on the membrane and the bridge form two plates of a capacitor to provide the means for sensing the deflections of the membrane by changes in capacitance of such capacitor.

17. The transducer of claim 14 wherein the cavity is formed as an indentation in the substrate having a deep central portion and shallow peripheral portions, and wherein the channel in the substrate is in communication with the shallower peripheral portions of the cavity.

18. The transducer of claim 14 including piezoresistive resistors formed on the polysilicon membrane to provide the means for sensing the deflections in the membrane by changes in the resistance of such resistors.

19. The transducer of claim 18 wherein the bridge is formed of a conductive metal, and further including a layer of conductive metal formed on the top surface of the membrane such that a capacitor is formed between the metal layer on the membrane and the bridge to provide the means for sensing deflections of the membrane by measuring the change in capacitance of such capacitor which is indicative of changes in displacement of the membrane, whereby the measurements of membrane displacements made by the change in capacitance and by the change in resistance of the piezoresistors can be correlated with each other.

* * * * *

UNITED STATES PATENT AND TRADEMARK OFFICE
CERTIFICATE OF CORRECTION

PATENT NO. : 5,357,807
DATED : October 25, 1994
INVENTOR(S) : Guckel, et al.

It is certified that error appears in the above-indentified patent and that said Letters Patent is hereby corrected as shown below:

In column 8, line 28 of the patent, delete "placing" and insert in its place --plating--

In column 13, line 12 of the patent, delete "4" and insert in its place --6--

In column 13, line 21 of the patent, delete "6" and insert in its place --8--

Signed and Sealed this

Twenty-third Day of January, 1996

Attest:

BRUCE LEHMAN

Attesting Officer     Commissioner of Patents and Trademarks